Patented Dec. 2, 1930

1,783,396

UNITED STATES PATENT OFFICE

JOHN T. TRAVERS OF COLUMBUS, CHARLES H. LEWIS, OF HARPSTER, AND OLIVER M. URBAIN, OF COLUMBUS, OHIO, ASSIGNORS TO THE OHIO SANITARY ENGINEERING CORPORATION, OF COLUMBUS, OHIO, A CORPORATION OF OHIO

MINERAL ADSORBENT AND PROCESS OF MANUFACTURING SAME

No Drawing. Application filed October 20, 1928. Serial No. 313,928.

This invention relates to an improved mineral adsorbent and a process of manufacturing the same. It is the purpose of the invention to provide an adsorbent adaptable to many uses, one which will function in a manner such as activated carbon adsorbents and one which can be more economically produced than adsorbents heretofore employed.

The adsorbent conforming to this invention is especially well adapted to use in the recovery of solvent vapors in those industries which employ organic solvents, particularly those of the benzene series.

The adsorbent is furthermore characterized by the fact that it possesses adsorptive qualities for substances both from liquids and from gases. It has a far greater adsorptive power for certain substances than any adsorbent heretofore known, more particularly such substances as phenols in their various forms including the higher phenols. The phenols are particularly difficult to adsorb, more especially from liquids.

The present invention provides an adsorbent which functions efficiently in the removal of phenols from liquids. The adsorbent is furthermore adapted to the removal of organic sulphur compounds from gases. The adsorbent is capable of many and various applications in the industries and it is understood that this disclosure does not restrict its use to any particular field.

The invention furthermore contemplates the provision of a novel and economical process of producing the new adsorbent.

After extensive research in the carrying out of multitudinous experiments employing natural adsorbent materials and known synthetic adsorbents, it has been determined that these adsorbents are either not efficient or are prohibitive in cost. There has long been a demand for a more economical, efficient adsorbent to replace the expensive adsorbents of limited adsorption power, and it is the primary object of the present invention to supply this demand.

It has been determined that salts of condensed ortho-silicic acid and the trivalent metals constitute an admirable base for the adsorbent conforming to the present invention. While these salts are fairly efficient adsorbents, they do not, as they occur in nature, or as synthetically produced, possess an adsorptive capacity or rate of adsorption necessary to render them commercially economical for any of the uses enumerated above. Utilizing a salt of a condensed ortho-silicic acid and a trivalent metal, preferably the aluminum silicate, kaolinite, in the form of a kaolinite-bearing material, such as pottery clays and certain cement dusts recovered from the precipitators employed in the manufacture of cement from slag, as a base for the adsorbent, the first step in the process preferably comprising mixing with the base material, as for example, a kaolinite-bearing substance, a substantial quantity of a carbonaceous substance such as sugar, powdered coal, the so-called "stick" a by-product of the rendering industry, or preferably saw dust. The carbonaceous material may be added to the kaolinite-bearing substance in various proportions, but it is found that for best results from the standpoint of the hardness of the finished adsorbent, that the carbonaceous material should not be added in an amount exceeding 75% by weight of the kaolinite-bearing substance. By sacrificing hardness of the final adsorbent material, the quantity of carbonaceous material added may, of course, be somewhat increased.

Following the admixture of the carbonaceous material and the kaolinite-bearing substance, there is added to the resultant mixture a solution of a normal silicate of an alkali metal, preferably sodium silicate. The solution should be added in an amount adequate to give to the material the consistency of a paste. Following the addition of the sodium silicate solution, there is next added to the mass a sufficient quantity of dilute acid to bring about a complete gelation of the sodium silicate content of the mass. Any of the strong acids, such as sulphuric, hydrochloric, nitric or acetic acids, may be used, but sulphuric acid is preferably employed. During the admission of the acid, the mass is preferably subjected to mild agitation. Following the addition of the acid, a retention period, preferably of from 2 to 3 hours is allowed, to permit the gelation of the sodium silicate to occur. As a result of the gelation of the sodium silicate, by the addition of the sulphuric acid, there are formed silica-gels. Following the period of gelation, the mass is subjected to a slow drying action, preferably it is initially air dried at room temperature for a period of 5 or 6 hours, following which the mass is subjected to a drying temperature of approximately 90 degrees C. for a period sufficient to free the mass from all uncombined moisture. No exact time period can be given for this drying period, as it will be dependent upon the efficiency of the drier employed.

Following the drying action, the mass represents a more or less compact relatively dense material. The next step in the process consists in subjecting the mass to ignition at temperatures ranging from 600 degrees C. to 900 degrees C., but preferably at approximately 650 degrees C., the ignition being effected in a reducing atmosphere. The desired results are accomplished by subjecting the mass to an ignition period of approximately fifteen minutes. The functions of the ignition of the mass are several; first, the kaolinite content of the mass loses its water of crystallization, and, second, all of the volatile constituents of the carbonaceous material are driven off, leaving numerous pockets or interstices containing unburned carbon and numerous passages throughout the mass formed as a result of the escape of the volatile gases from the ignition of the carbonaceous matter and the escape of the combined moisture.

Following the ignition, the product is therefore exceedingly porous and has a tremendous specific surface, affording an exceptionally large adsorption area. The product of the ignition is gray in color; has a hardness substantially equal to porous building tile, and has a specific gravity ranging from 2.2 to 2.7. The product of the ignition contains the salt formed as a result of the reaction of the acid used with the alkali silicate employed. As for example, when sodium silicate and sulphuric acid are employed, the salt is sodium sulphate. If the resultant product is to be used as an adsorbent for liquids, more particularly for water solutions, this salt will be readily washed from the material in use. Should it be desired, however, to use the adsorbent for gases, this salt should preferably be removed by water washing the product of ignition, which will, due to the high solubility of the salt, result in its immediate and complete removal.

The final product of the process, therefore, comprises in the main, particles of a dehydrated salt of a condensed ortho-silicic acid and a trivalent metal cemented together by silica. The final product also contains a small amount of unburned carbon which is responsible for the gray color.

It will at once be appreciated that the carbonization of the carbonaceous material during the step of ignition, makes available a very extensive adsorptive surface for a given volume of the ultimate product.

It is, of course, possible to eliminate the addition of the carbonaceous material, but the resultant product is correspondingly defective in that the available adsorptive surface is greatly diminished. It will be understood that the addition of the carbonaceous material, with the resultant formation of carbon, does not in itself increase the adsorption capacity of the adsorbent, but functions to increase the adsorptive surface and in this way increases the adsorption powers of the ultimate product.

The adsorbent manufactured in accordance with this invention possesses adequate hardness to prevent its wearing away by abrasion and furthermore has an adsorptive capacity as well as a rate of adsorption greater than the best grade of activated carbon adsorbents now available. As a specific example of the effectiveness of the adsorbent, it has been found to adsorb at least 20% more benzene, xylene or toluene, respectively, than activated carbon produced from peach pits, regarded as one of the highest quality activated carbon adsorbents.

It is here desired to point out that the adsorptive powers of the base material, namely, the salt of a condensed ortho-silicic acid and a trivalent metal, are improved by the various steps of the process, more particularly by the addition of a solution of a silicate of an alkali metal and further by the addition of an acid to effect gelation, as well as by the steps of drying and of ignition. It will therefore be appreciated that various intermediate products of the process are available adsorbents, but of a lesser degree of efficiency than the ultimate product of the process. For example, following the step of adding the solution of the silicate of the alkali metal and without the addition of any carbonaceous material, the pasty mass may be dried, granulated and this intermediate product employed as an adsorbent. In like manner the paste following the addition thereto of the acid, may be dried and granulated and this intermediate product employed as an adsorbent. In the latter case the adsorbent will be somewhat improved over the product to which no acid is added. The complete process, however, yields a very superior adsorbent and the invention is preferably practiced by carrying out the complete process as hereinbefore described.

A hundred pounds of the adsorbent may be produced in accordance with the above process, employing the component constituents in the following proportions:

1. A salt of a condensed ortho-silicic acid and a trivalent metal, for example, (kaolinite-bearing substance) 28.3 pounds.
2. Carbonaceous material (dry yellow pine sawdust) 21.3 pounds.
3. Sodium silicate solution (specific gravity 1.38) 44.2 pounds.
4. Sulphuric acid (specific gravity 1.25) 67.7 pounds.

It will be appreciated that there occurs during the process of manufacture a loss of approximately 61.5 pounds, this being largely the water removed and the volatile hydrocarbons driven off from the carbonaceous material.

A highly efficient adsorbent can be produced in accordance with this invention at a cost not to exceed 25% of the lowest price of the activated carbon adsorbents now commercially employed. It must furthermore be appreciated that the supply of raw materials for the production of activated carbon adsorbents is exceedingly limited, whereas the sources of raw material for the production of the adsorbent of the present invention are practically unlimited.

What we claim for our invention is:

1. A process for producing an improved adsorbent, comprising mixing a salt of a condensed ortho-silicic acid and a trivalent metal with a carbonaceous material, adding to the mixture a solution of a silicate of an alkali metal, incorporating in the mass a dilute solution of a strong acid, drying the resultant mass and thereafter subjecting the mass to ignition to drive off the volatile constituents of the carbonaceous content thereof and free the same from combined moisture.

2. A process for producing an improved adsorbent, including the steps of mixing with a salt of a condensed ortho-silicic acid and a trivalent metal, a solution of a silicate of an alkali metal and a dilute solution of a strong acid.

3. A process for producing an improved adsorbent, including the steps of mixing with a salt of a condensed ortho-silicic acid and a trivalent metal, a solution of a silicate of an alkali metal and a dilute solution of a strong acid, subjecting the resultant mass to a drying action and thereafter subjecting the same to ignition at a temperature in excess of 600 degrees C.

4. A method for improving the adsorptive qualities of a salt of a condensed ortho-silicic acid and a trivalent metal, comprising treating the same with a solution of a silicate of an alkali metal.

5. A method for improving the adsorptive qualities of a salt of a condensed ortho-silicic acid and a trivalent metal, comprising treating the same with a solution of a silicate of an alkali metal and a dilute solution of a strong acid and thereafter drying the resultant mass and subjecting the same to ignition.

6. A method for improving the adsorptive properties of a salt of a condensed ortho-silicic acid and a trivalent metal, comprising mixing therewith a quantity of carbonaceous material, treating the resultant mixture with a solution of a silicate of an alkali metal, incorporating in the resultant mass a dilute solution of a strong acid and thereafter subjecting the mass to drying and following the drying action subjecting the same to ignition.

7. A process for producing an improved adsorbent, comprising mixing a kaolinite-bearing material with a carbonaceous material, adding to the mixture a solution of a silicate of an alkali metal, incorporating in the mass a dilute solution of a strong acid, drying the resultant mass and thereafter subjecting the mass to ignition to drive off the volatile constituents of the carbonaceous content thereof and free the same from combined moisture.

8. A process for producing an improved adsorbent including the steps of adding to a kaolinite-bearing material, a solution of a silicate of an alkali metal and thereafter drying the resultant mixture.

9. A process for producing an improved adsorbent, comprising mixing a salt of a condensed ortho-silicic acid and a trivalent metal with a carbonaceous material, adding to the mixture a sodium silicate solution, incorporating in the mass a dilute solution of a strong acid, drying the resultant mass and thereafter subjecting the mass to ignition to drive off the volatile constituents of the carbonaceous content thereof and free the same from combined moisture.

10. A process for producing an improved absorbent, including the steps of mixing with a salt of a condensed ortho-silicic acid and a trivalent metal, a sodium silicate solution and a dilute solution of a strong acid.

11. A process for producing an improved absorbent including the steps of adding to a salt of a condensed ortho-silic acid and a trivalent metal a sodium silicate solution and thereafter drying the resultant mixture.

12. A method for improving the absorptive qualities of a salt of a condensed ortho-silicic acid and a trivalent metal, comprising treating the same with a sodium silicate solution.

13. A method for improving the adsorptive qualities of a salt of a condensed ortho-silicic acid and a trivalent metal, comprising treating the same with a sodium silicate solution and a dilute solution of a strong acid and thereafter drying the resultant mass and subjecting the same to ignition.

14. A method for improving the adsorptive properties of a salt of a condensed ortho-silicic acid and a trivalent metal, comprising mixing therewith a quantity of carbonaceous material, treating the resultant mixture with a sodium silicate solution, incorporating in the resultant mass a dilute solution of a strong acid and thereafter subjecting the mass to drying and following the drying action subjecting the same to ignition.

15. A process for producing an improved adsorbent, comprising mixing a salt of a condensed ortho-silicic acid and a trivalent metal with a carbonaceous material, adding to the mixture a solution of a silicate of an alkali metal, incorporating in the mass a dilute solution of sulphuric acid, drying the resultant mass and thereafter subjecting the mass to ignition to drive off the volatile constituents of the carbonaceous content thereof and free the same from combined moisture.

16. A process for producing an improved adsorbent, including the steps of mixing with a salt of a condensed ortho-silicic acid and a trivalent metal, a solution of a silicate of an alkali metal and a dilute solution of sulphuric acid, subjecting the resultant mass to a drying action and thereafter subjecting the same to ignition at a temperature in excess of 600° C.

17. A method for improving the adsorptive properties of a salt of a condensed ortho-silicic acid and a trivalent metal, comprising mixing therewith a quantity of carbonaceous material, treating the resultant mixture with a solution of a silicate of an alkali metal, incorporating in the resultant mass a dilute solution of sulphuric acid and thereafter subjecting the mass to drying and following the drying action subjecting the same to ignition.

18. A process for producing an improved adsorbent, comprising mixing a kaolinite-bearing material with a carbonaceous material, adding to the mixture a sodium silicate solution, incorporating in the mass a dilute solution of sulphuric acid, drying the resultant mass and thereafter subjecting the mass to ignition to drive off the volatile constituents of the carbonaceous content thereof and free the same from combined moisture.

19. A process for producing an improved adsorbent, including the steps of mixing with a kaolinite-bearing material, a sodium silicate solution and a dilute solution of sulphuric acid.

20. A method for improving the adsorptive qualities of a kaolinite-bearing material, comprising treating the same with a sodium silicate solution and a dilute solution of sulphuric acid and thereafter drying the resultant mass and subjecting the same to ignition.

21. A process for producing an improved adsorbent, comprising mixing a kaolinite-bearing clay with a carbonaceous material, adding thereto a sodium silicate solution in an amount adequate to form a paste, then incorporating in the paste a quantity of sulphuric acid, allowing a period of substantially two hours to permit silica-gel formation to take place subsequent to the period of gelation subjecting the mass to a drying action, first at room temperature and thereafter at a temperature of approximately 90 degrees centigrade, following the drying action subjecting the mass to ignition at a temperature of approximately 650 degrees C. for a period of from 10 to 15 minutes.

22. A process for producing an improved adsorbent, comprising mixing a kaolinite-bearing clay with sawdust, adding thereto a sodium silicate solution in an amount adequate to form a paste, then incorporating in the paste a quantity of sulphuric acid, allowing a period of substantially two hours to permit silica-gel formation to take place subsequent to the period of gelation subjecting the mass to a drying action, first at room temperature and thereafter at a temperature of approximately 90 degrees C., following the drying action subjecting the mass to ignition at a temperature of approximately 650 degrees C. for a period of from 10 to 15 minutes.

23. A process for producing an improved adsorbent, comprising mixing a kaolinite-bearing clay with a carbonaceous material, adding thereto a sodium silicate solution in an amount adequate to form a paste, then incorporating in the paste a quantity of sulphuric acid, allowing a period of substantially two hours to permit silica-gel formation to take place subsequent to the period of gelation subjecting the mass to a drying action first at room temperature and thereafter at a temperature of approximately 90 degrees C., following the drying action subjecting the mass to ignition at a temperature of approximately 650 degrees C. for a period of from 10 to 15 minutes, and water washing the resulting product to remove sodium sulphate formed during the process.

24. A process for producing an improved adsorbent, comprising mixing a kaolinite-bearing clay with sawdust, adding thereto a sodium silicate solution in an amount adequate to form a paste, then incorporating in the paste a quantity of sulphuric acid, allowing a period of substantially two hours to permit silica-gel formation to take place subsequent to the period of gelation subjecting the mass to a drying action first at room temperature and thereafter at a temperature of approximately 90 degrees C., following the drying action subjecting the mass to ignition at a temperature of approximately 650 degrees C. for a period of from 10 to 15 minutes, and water washing the resulting product to remove sodium sulphate formed during the process.

25. A synthetic adsorbent containing substantial quantities of particles of a salt of a condensed ortho-silicic acid and a trivalent metal cemented together by silica.

26. A synthetic adsorbent containing substantial quantities of particles of a salt of a condensed ortho-silicic acid and a trivalent metal cemented together by silica, having a hard, porous structure and a specific gravity of from 2.2 to 2.7.

27. A synthetic adsorbent containing substantial quantities of kaolinite particles cemented together by silica.

28. A synthetic adsorbent containing kaolinite particles cemented together by silica and having a specific gravity from 2.2 to 2.7.

JOHN T. TRAVERS.
CHARLES H. LEWIS.
OLIVER M. URBAIN.